Aug. 10, 1965  J. M. CLAPP  3,199,644
AUTOMATIC RELEASING CLUTCH MECHANISM RESPONSIVE
TO TORQUE LOADS FOR USE IN POWER TOOLS
Filed Sept. 24, 1963  4 Sheets-Sheet 2

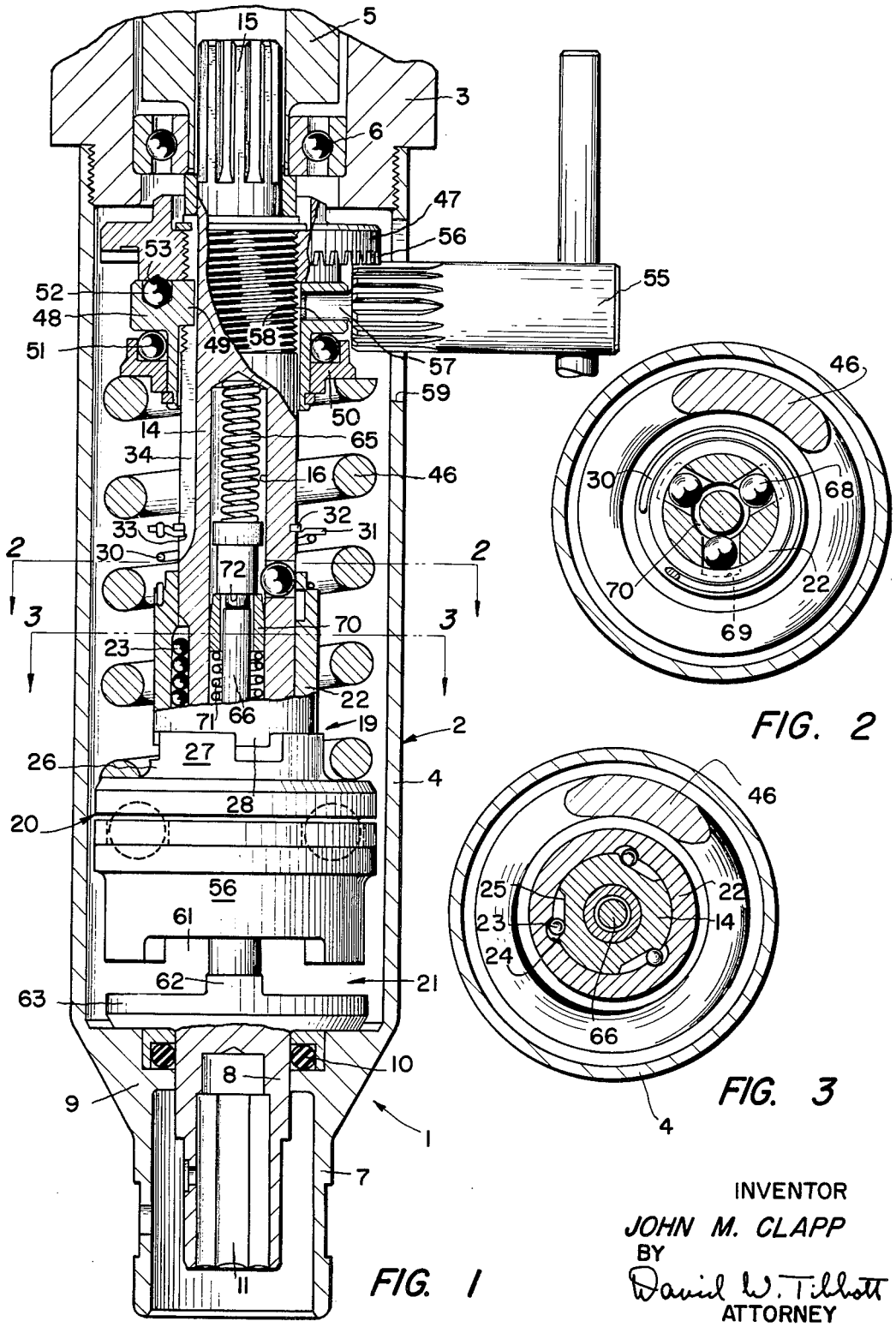

INVENTOR
JOHN M. CLAPP
BY
David W. Tillott
ATTORNEY

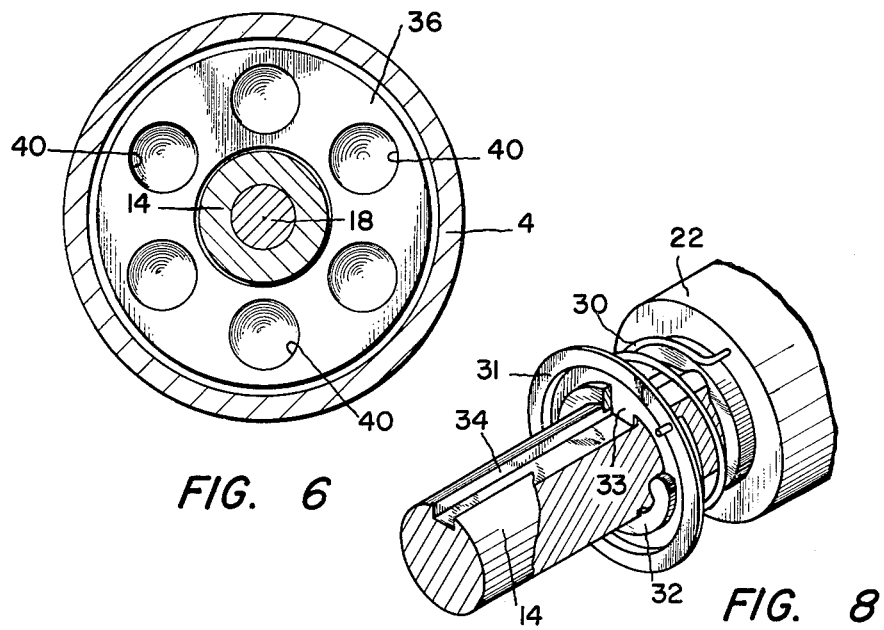
FIG. 6
FIG. 8
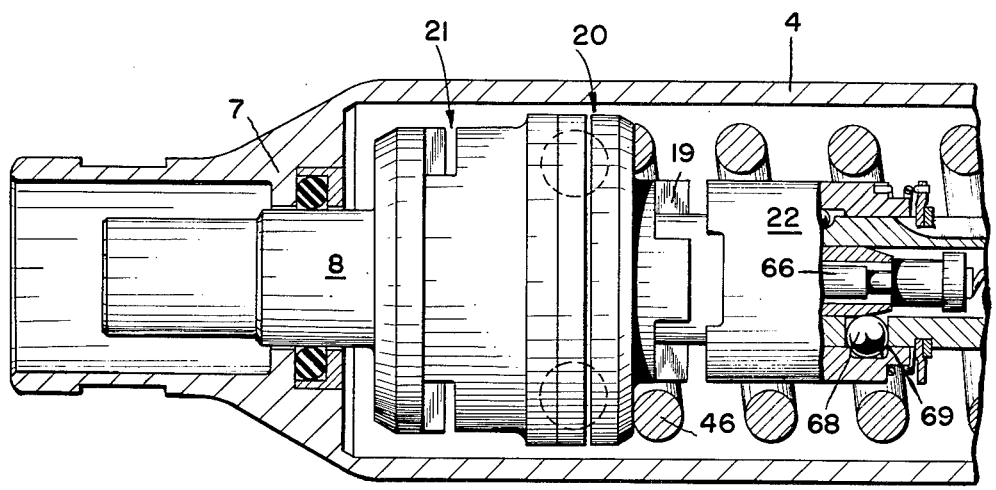
FIG. 7
INVENTOR
JOHN M. CLAPP
BY
David W. Tibbott
ATTORNEY Aug. 10, 1965    J. M. CLAPP    3,199,644
AUTOMATIC RELEASING CLUTCH MECHANISM RESPONSIVE
TO TORQUE LOADS FOR USE IN POWER TOOLS
Filed Sept. 24, 1963    4 Sheets-Sheet 4

INVENTOR
JOHN M. CLAPP
BY
David W. Tibbott
ATTORNEY

United States Patent Office 3,199,644
Patented Aug. 10, 1965

3,199,644
AUTOMATIC RELEASING CLUTCH MECHANISM RESPONSIVE TO TORQUE LOADS FOR USE IN POWER TOOLS
John M. Clapp, Athens, Pa., assignor to Ingersoll-Rand Company, New York, N.Y., a corporation of New Jersey
Filed Sept. 24, 1963, Ser. No. 311,152
5 Claims. (Cl. 192—56)

This invention relates to a torque release clutch mechanism which opens a drive connection between a driving member and a driven member when the torque load on said members exceeds a predetermined value or magnitude. The torque release clutch mechanism of this invention is particularly useful for use in tools which apply torque loads to workpieces, such as power-operated wrenches or screw drivers. This application is an improvement of the clutch disclosed and claimed in the U.S. application Serial No. 215,883, filed August 9, 1962, Patent No. 3,174,599, and invented by E. G. Spyridakis and John M. Clapp.

In driving a screw or other threaded fastener "home," into a holding position, it is highly desirable to use a power-operated tool containing a torque release clutch which automatically releases the torque driving force on the fastener after it is tightened to a given or predetermined torque load. It is also desirable to use the same tool to loosen or remove fasteners. In the latter case, it is highly desirable for the tool to apply a series of rotary impacts to the fastener, since rotary impacts are much more effective in loosening stuck fasteners than a continuous torque load applied by the same size tool.

The principal object of this invention is to provide a torque release clutch mechanism for a torque tool which releases itself under a predetermined torque load when tightening a fastener and which applies a series of rotary impacts when loosening or removing a fastener.

A further object of this invention is to provide a torque release clutch mechanism which releases itself and locks open under a predetermined torque load in one direction of rotation, but does not lock open upon release in the other direction of rotation.

The invention is shown in the accompanying drawings wherein:

FIG. 1 is a longitudinal section of the front portion of a power-operated torque tool with some parts being shown in elevation;

FIG. 2 is a section taken on line 2—2 of FIG. 1;

FIG. 3 is a section taken on line 3—3 of FIG. 1;

FIG. 6 is a section taken on line 6—6 of FIG. 5;

FIG. 7 is a longitudinal section similar to FIG. 4 and showing the torque release clutch in a fully disengaged position;

FIG. 8 is a fragmentary perspective view of the means for preventing the torque release clutch mechanism from locking open when rotated in a reverse direction;

Figure 4:
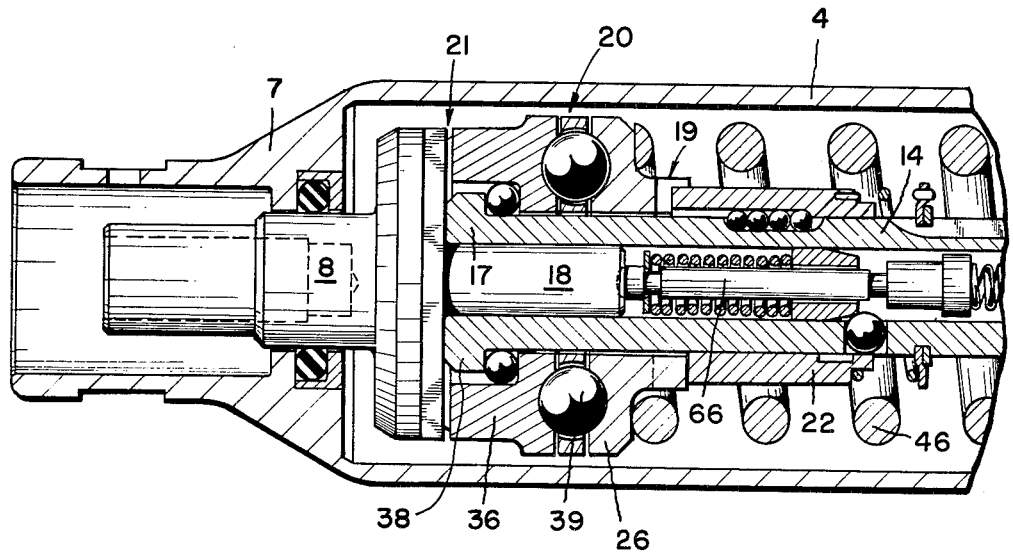
FIG. 4 is a longitudinal section similar to FIG. 1 and showing the tool with its manually-operated push-clutch engaged.

The power-operated screw driver 1 shown in the drawings includes a hollow cylindrical casing 2 formed by a rear portion 3 and a front portion 4 threadedly connected to the rear portion 3. The rear casing portion 3 houses a conventional rotary motor (not shown), such as an electric motor or a pneumatic motor driving an output shaft 5 through a set of reduction gears (not shown). The output shaft 5 is mounted at its front end on a bearing 6 carried by the front end of the rear casing portion 3. The front casing portion 4 includes a reduced diameter nose 7 on its front end. The nose 7 contains a conventional tool holder or spindle 8 which is rotatively mounted in and extends through an integral partition 9 located at the rear of the nose 7. The tool holding spindle 8 is surrounded by an O-ring 10 for sealing purposes and contains a polygonal socket 11 adapted to receive various types of tools or fastener engaging tips (not shown), such as screw driver tip. All of the foregoing structure is conventional and usually found in power-operated screw drivers.

The torque-release clutch mechanism of this invention provides a drive connection between the output shaft 5 and the tool holding spindle 8. It includes a drive shaft 14 which extends axially through the front casing portion 4 and has a splined rear end 15 seated in a cooperating splined socket in the output shaft 5, thus providing a drive connection between the drive shaft 14 and the motor. The drive shaft 14 contains a hollow bore 16 which opens at its front end 17 and extends rearwardly therefrom along about two thirds of the length of the drive shaft 14. The rear end of the tool holding spindle 8 includes a reduced diameter stem 18 which projects rearwardly into the axial bore 16 of the drive shaft 14 for a short distance and is free to rotate therein, relative to the shaft 14.

The drive shaft 14 drives the tool holding spindle 8 through a series of three clutches designated in sequence, proceeding from the drive shaft 14 to the spindle 8, as follows: a "lock-out" clutch 19, a "cam-thrust" clutch 20 and a "push-engaged" clutch 21. These clutches are described hereafter in the above sequence.

"Lock-out" clutch 19

A rear clutch sleeve 22 is keyed on the drive shaft 14 intermediate its ends by a plurality of key balls 23 seating in cooperating longitudinally-extending internal grooves 24 formed in the sleeve 22 and external grooves 25 formed in the drive shaft circumference, as shown in FIG. 3. The sleeve 22 is free to slide axially on the drive shaft 14 for a limited distance and is driven by the drive shaft through the key balls 23. As seen in FIG. 3, the external grooves 25 on the drive shaft 14 are wider than the internal grooves 24 on the sleeve 22 so that the sleeve 22 can rotate on the drive shaft through a small angle of limited relative rotation. The purpose of this limited relative rotation will be explained later.

An intermediate clutch plate 26 is slidably and rotatively mounted on the drive shaft 14 in front of the rear clutch sleeve 22 and connected to the rear clutch sleeve 22 through a series of inter-engaging notched or machicolated teeth or jaws 27 and 28 integrally formed on the plate 26 and sleeve 22, respectively. The inter-engaging jaws 27 and 28 form the "lock-out" clutch 19. The sleeve 22 and plate 26 can slide axially on the drive shaft 14 between positions wherein the "lock-out" clutch teeth 27 and 28 are engaged and positions wherein they are disengaged. When the teeth 27 and 28 are engaged, the sleeve 22 drives the clutch plate 26 and when disengaged, the sleeve 22 is free to rotate relative to the clutch plate 26.

The rear clutch sleeve 22 is biased forwardly by a light combination compression and torsion spring 30 extending between the rear of the sleeve 22 and a washer 31 keyed to the drive shaft 14 and abutting a snap ring 32 engaging a circumferential groove in the drive shaft 14. The keying of the washer 31 is performed by an inwardly extending tang 33 on the washer 31 fitting in a longitudinal kerf 34 cut in the drive shaft 14. The ends of the torsion spring 30 fit into longitudinal holes formed in the rear edge of the clutch sleeve 22 and the washer 31, respectively, and the spring 30 is arranged to bias the clutch sleeve 22 in both a forward direction and in a counterclockwise rotary direction, looking at the sleeve from its rear end. The purpose of biasing the clutch sleeve 22 in a rotary direction will be seen later.

"Cam-thrust" clutch 20

A front clutch plate 36 is rotatively mounted on the front end 17 of the drive shaft 14 in front of the intermediate clutch plate 26. The front clutch plate 36 rotates on ball bearings 37 engaging an enlarged shoulder 38 on the front end of the drive shaft 14.

The intermediate and front clutch plates 26 and 36 are interconnected together by a series of circumferentially spaced balls 39 which seat in cooperating individual concave seats 40 formed in the adjacent surfaces of both clutch plates 26 and 36. The balls 39 and seats 40 provide a driving connection between the two clutch plates 26 and 36 so long as the plates are pressed together and the balls 39 remain in their seats. The balls 39 are angularly spaced about the drive shaft 14 by a perforated retainer disc 41 located between the clutch plates 26 and 36. The balls 39 and seats 40 form the "cam-thrust" clutch 20.

The intermediate clutch plate 26 is biased against the front clutch plate 36 by a heavy compression spring 46 which is engaged at its rear end by an adjustment mechanism for varying the compression load on the spring 46. The compression force exerted by the heavy spring 46 tends to keep the balls 39 in their seats 40 during the transmission of a torque load through the "cam-thrust" clutch 20. When the torque on the clutch plates 26 and 36 reaches a predetermined magnitude, determined by the load on the spring 46, the balls 39 roll out of their seats 40 and cam-thrust the intermediate clutch plate 26 rearwardly, against the spring 46, thus releasing the "cam-thrust" clutch 20. The magnitude of torque at which the balls 39 roll out of their seats 40 is changed by varying the compression load on the spring 46. The torque value at which the "cam-thrust" clutch 20 will release rises as the load on the spring 46 increases and drops as the spring load decreases. As the "cam-thrust" clutch 20 releases, it also cams the rear clutch sleeve 22 rearwardly on the drive shaft 14 to a retracted position.

The adjustment mechanism for the spring 46 includes a nut 47 threaded on the rear end of the drive shaft 14, a collar 48 keyed on the drive shaft by means of an integral tongue 49 sliding in the kerf 34, and a spring seat ring 50 rotatably mounted on the collar 48 by ball bearing 51. Turning the nut 47 on the drive shaft 14 moves the collar 48 and ring 50 forwardly or rearwardly to increase or decrease the tension on the spring 46. The nut 47 is latched in an adjusted position by detent balls 52 mounted in the rear face of the collar 48 and engaging detent cavities 53 in the front face of the nut 47.

The turning of the nut 47 on the drive shaft 14 is easily performed by means of a geared key 55, shown in FIG. 1, which engages the gear teeth 56 formed on the nut 47. The gear key 55 has an axial pin 57 at its geared end which seats in radial holes 58 formed in the collar 48 and is placed in its operative position by inserting it through an access hole 59 in the casing 2. It will be understood that the key 55 is only used during the adjustment of the load on the spring 46.

"Push-engaged" clutch 21

The front clutch plate 36 is provided on its front end with a pair of notches 61 adapted to receive a diametrically extending bar 62 carried on the rear face of a circular flange 63 integrally formed on the tool holding spindle 8. The notches 61 engage the bar 62 to connect the front clutch plate notches 61 engage the bar 62 to connect the front clutch plate 36 to the spindle 8 for driving purposes. This driving connection is accomplished by the tool spindle 8 moving axially rearward in the casing 2, caused by the operator pushing the screw driver 1 axially against its workpieces prior to the start of its operation. The "push-engaged" clutch 21 is formed by the notches 61 and the diametrical bar 62.

The tool holding spindle 8 is biased forwardly away from the main drive shaft 14 to keep the "push-engaged" clutch 21 normally disengaged, as shown in FIG. 1. This biasing force is provided by a compression spring 65, located in the axial bore 16 of the drive shaft 14 and abutting the rear end of the bore 16 and a rod 66 which extends forward into contact with the rear stem 18 of the tool holding spindle 8. The rod 66 is freely slidable in the bore 16 and, in effect, serves as an extension of the stem 18 of the tool holding spindle 8. In using the screw driver 1, an operator pushes the tool bit (not shown) axially forward against a workpiece, such as a fastener, with sufficient force to overcome the spring 65 and to force the tool holding spindle 8 axially rearward until the diametrical bar 62 on the spindle 8 is engaged in the notches 61 on the front clutch plate 36, as shown in FIG. 4. This step places the screw driver in condition for operation. At the end of a fastener turning operation, the operator relaxes the forward axial thrust on the screw driver 1 and the tool holding spindle 8 moves forwardly to disengage the "push-engaged" clutch elements 61 and 62.

Means for holding "lock-out" clutch open

Figure 5:
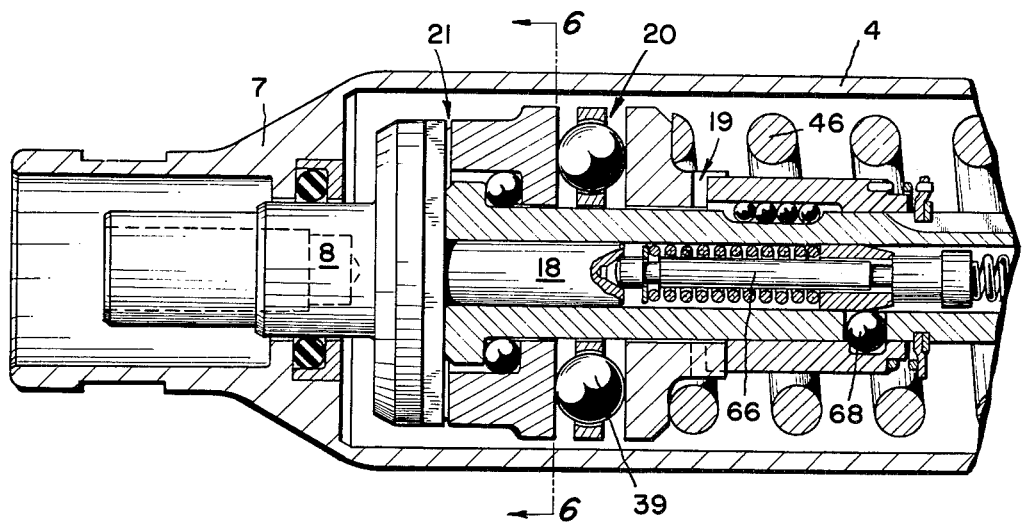
FIG. 5 is a longitudinal section similar to FIG. 4 and showing the torque release clutch mechanism as it initially disengages.

When the torque load transmitted by the "cam-thrust" clutch 20 reaches a predetermined value or magnitude, the balls 39 roll out of their seats 40 and force both the intermediate clutch plate 26 and the rear clutch sleeve 22 to move rearwardly on the drive shaft 14 to the rearward position shown in FIG. 5. After this operation occurs, the rear clutch sleeve 22 is locked in a rearward position and the intermediate clutch plate 26 again moves forwardly as the balls 39 drop into other ball seats 40, thus causing the engaged teeth 27 and 28 on the rear clutch sleeve 22 and intermediate clutch plate 26 to separate from each other and open or break the drive connection of the "lock-out" clutch 19, as shown in FIG. 7.

The means for locking the rear clutch sleeve 22 in its rearwardly retracted position shown in FIG. 5 includes a group of lock balls 68 carried in radial holes in the drive shaft 14 and biased outwardly into several cumferentially spaced cavities 69 formed in the interior of the rear clutch sleeve 22. The lock balls 68 are biased radially outward by a conical cam 70 sliding on the rod 66 in the bore 16 of the drive shaft 14 and a compression cam spring 71 carried on the rod 66 and biasing the conical cam rearwardly against the lock balls 68.

The conical cam 70 is actuated to bias the lock balls 68 outwardly by the rearward movement of the rod 66 in the driven shaft bore 16 when the "push-engaged" clutch 21 is engaged. When the "push-engaged" clutch 21 is disengaged, the conical cam 70 is moved forward by a shoulder 72 on the rod 66 to release its outward biasing force on the lock balls 68.

Figure 10:
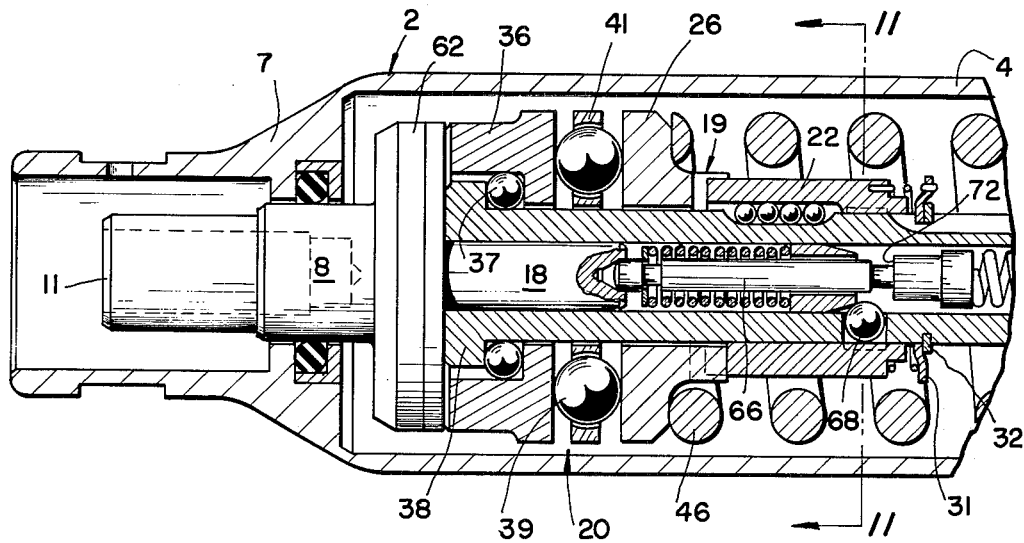
FIG. 10 is a longitudinal section similar to FIG. 5 showing the clutch mechanism at it rotates in a reverse direction.
Figure 11:
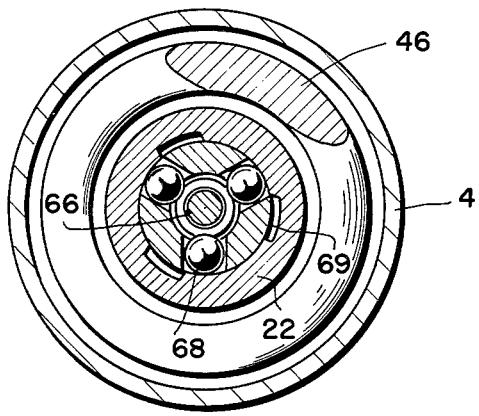
FIG. 11 is a section taken on line 11—11 of FIG. 10.
Figure 9:
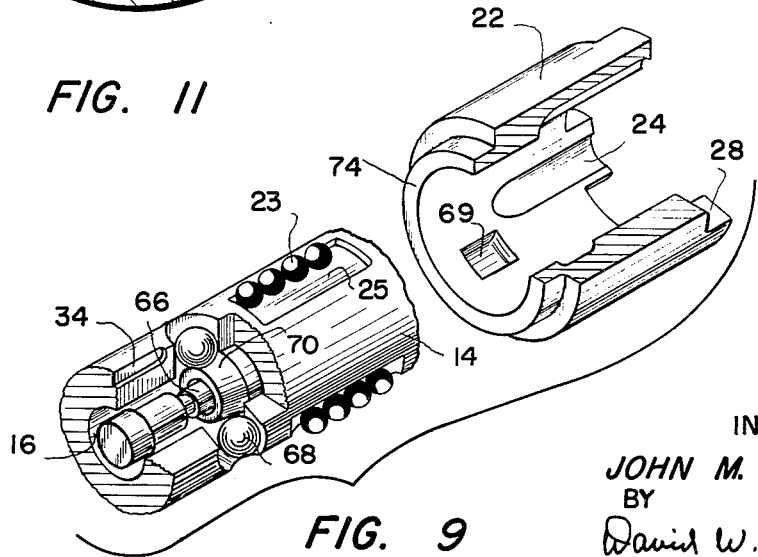
FIG. 9 is an exploded perspective view of portions of the torque release clutch mechanism.

"Means for preventing lock-out" clutch from locking open when tool is reversed Although the lock balls 68 lock the "lock-out" clutch 19 open when drive shaft 14 turns in a clockwise direction, looking at the rear end of the drive shaft 14, they fail to lock it open during the reverse rotation of the drive shaft 14, when the screw driver is being used to loosen a fastener. This function is accomplished by rotating the rear clutch sleeve 22 relative to the lock balls 68 sufficiently to move the lock ball cavities 69 out of radial alignment with the lock balls 68, as shown in FIGS. 10 and 11, so that the lock balls 68 can no longer lock the rear clutch 22 in its rear position. When the drive shaft 14 is driven in a reverse direction, counterclockwise looking at the rear end of the drive shaft 14, the torsion spring 30 is overcome and the rear clutch sleeve 22 rotates relative to the drive shaft 14 through a limited angle until the lock ball cavities 69 are out of radial alignment with the lock balls 68. The limited relative rotary movement of the sleeve 22 on the drive shaft 14 is allowed by the wide external grooves 25 on the drive shaft circumference holding the key balls 23, as shown in FIG. 3.

Since the lock balls 68 are ineffective to lock the rear clutch sleeve 22 in its rear position, the "cam-thrust" clutch 20 will alternately disengage and re-engage periodically when the torque load on the clutch 20 is high enough for the clutch 20 to open. This alternate opening and closing of the clutch 20 applies a series of rotary impacts to the front clutch plate 36, resulting in these impacts being transmitted to the socket 11. Thus, when the tool is unscrewing a fastener, it applies a series of rotary impacts to the fastener if the fastener is tight enough to cause the "cam-thrust" clutch 20 to open. If the fastener is loose enough to turn without causing the "cam-thrust" clutch 20 to open, the tool does not apply rotary impacts.

Operation

Prior to the start of operation, the screw driver 1 is in the condition shown in FIG. 1. Both of the "lock-out" and "cam-thrust" clutches 19 and 20 are closed and the "push-engaged" clutch 21 is open. The conical cam 70 is withdrawn from the lock balls 68 so that the lock balls 68 are not biased radially outward and the torsion spring 30 is biasing the rear clutch sleeve 22 in a rotary direction around the drive shaft 14 to the position shown in FIG 2 wherin the ball cavities 69 are in angular alignment with the lock balls 68.

Before using the screw driver 1, the gear key 55 is used to turn the nut 47 until the heavy spring 46 is loaded to the desired magnitude, which determines the predetermined magnitude of torque under which the "cam-thrust" clutch 20 will open.

Initially, to tighten a fastener, the tool tip (not shown) is placed against the head of the fastener and the screw driver 1 is pressed axially forward to force the tool holding spindle 8 axially rearward in the casing 2 and to engage the "push-engaged" clutch 21. Simultaneously, the motor (not shown) is energized to start rotating the output shaft 5 and drive shaft 14 in a clockwise direction.

As the "push-engaged" clutch 21 is initially engaged, the rod 66 is moved rearwardly in the bore 16 of the drive shaft 14, causing the conical cam 70 and its spring 71 to engage and bias the lock balls 68 radially outwardly, as shown in FIG. 4. However, since the rear clutch sleeve 22 is in its forward position at this time, the balls 68 cannot engage the lock ball cavities 69 in the interior of the sleeve 22. Hence, at this time, the lock balls 68 are not performing any function, but are merely "cocked" and ready to lock the sleeve 22 when it moves into a locking position.

As the drive shaft 14 rotates, its drive torque is transmitted through the "lock-out" clutch 19, the "cam-thrust" clutch 20 and the "push-engaged" clutch 21 to the tool holding spindle 8, thus driving the fastener inwardly into its hole. During this step, the parts of the clutch mechanism of the screw driver 1 are arranged as shown in FIG. 4.

As the fastener is driven into place by the screw driver 1 and "seated", the torque load on the "cam-thrust" clutch 20 rises rapidly until it reaches a magnitude sufficient to cause the clutch balls 39 to roll out of their seats 40 and, as a result, to cam-thrust the intermediate clutch plate 26 and the rear clutch sleeve 22 rearwardly on the drive shaft 14.

The magnitude of torque on the "cam-thrust" clutch 20 corresponds to the torque load on the fastener being tightened; hence, the fastener is fully tightened when the "cam-thrust" clutch 20 opens. When the rear clutch sleeve 22 arrives at its fully retracted position, shown in FIG. 5, the lock balls 68, previously placed under an outward biasing force, move outwardly into the lock ball cavities 69 to lock the clutch sleeve 22 in its retracted position.

Thereafter, the "cam-thrust" balls 39 move into other seats 40 and allow the intermediate clutch plate 26, under the biasing force of the spring 46, to return to its forward seated position, thereby opening the "lock-out" clutch 19, as shown in FIG. 7. In this condition, the drive train between the drive shaft 14 and the tool holding spindle 8 is broken and the drive shaft 14 is free to rotate without a torque load, which causes the motor to increase its speed rapidly.

The release of the torque load on the tool motor signals the operator that the fastener is tightened properly and he removes the screw driver 1 from the fastener, thus allowing the tool holding spindle 8 to move axially forward and open the "push-engaged" clutch 21. The forward movement of the spindle 8 is accompanied by a corresponding forward movement of the rod 66, which forces the conical cam 70 away from the lock balls 68. Thereafter, the lock balls 68 move radially inward and the "lock-out" clutch 19 closes, resulting in the screw driver 1 returning to the condition shown in FIG. 1.

During the operation of the screw driver 1 in a reverse direction to loosen or unscrew a fastener, the "cam-thrust" clutch 20 alternately opens and closes when the torque load rises high enough to open the clutch 20.

The screw driver tip is engaged against the fastener and pushed axially forward to engage the "push-engaged" clutch 21 and to bias the lock balls 68 radially outward in the same manner as earlier described in the fastener tightening operation. Simultaneously, the motor is energized to drive the drive shaft 14 in a counterclockwise or reverse direction.

Placing a counterclockwise torque on the drive shaft 14 acts against the torsion spring 30 and turns the drive shaft 14 counterclockwise, looking at FIG. 3, relative to the rear clutch sleeve 22 to a position wherein the lock balls 68 are out of angular alignment with the lock ball cavities 69. Thereafter, when the load on the "cam-thrust"clutch 20 rises enough to open it, the balls 39 roll out of their seats 40. However, the "lock-out" clutch 19 cannot lock the rear clutch sleeve 22 in its rear position and the balls 39 drop into the seats again after rolling a short distance, resulting in the torque of the tool being applied to the front clutch plate 36 as a series of rotary impacts.

When the fastener is withdrawn from its hole, the operator stops the screw driver motor and removes the screw driver from the fastener to again allow the "push-engaged" clutch 21 to open and remove the outward biasing force from the lock balls 68. Thereafter, the torsion spring 30 returns the clutch sleeve 22 to the position shown in FIGS. 1 to 3, wherein the screw driver is ready for another operation.

It will be understood that although only one embodiment of the invention is specifically described, the invention may embrace various other embodiments which are obvious from an understanding of the described embodiment and are embraced within the claims of the invention.

Having described my invention, I claim:
1. A torque transmitting apparatus comprising:
 (a) a hollow drive shaft;
 (b) first and second clutch sleeves mounted on said shaft for axially slidable movement and having normally interengaged clutch teeth locking the two clutch sleeves against relative rotation;
 (c) said first clutch sleeve being mounted on said drive shaft by a driving connection to be driven thereby;
 (d) a third clutch sleeve rotatably mounted on said shaft and being drivingly interengaged with said second clutch sleeve by torque clutch release means operative to force said first and second clutch sleeves axially away from said third clutch sleeve when the torque on said torque clutch release means exceeds a predetermined load;

(e) a driven member connected to said third clutch sleeve to be driven thereby;

(f) first biasing means yieldably forcing said second clutch sleeve axially against said third clutch sleeve;

(g) second biasing means yieldably forcing said first clutch sleeve axially against said second clutch sleeve;

(h) latch means operative to lock said first clutch sleeve in an axially retracted and spaced position from said second clutch sleeve after being moved to said retracted position by said torque clutch release means; and (i) means operative in one direction of rotation of said drive shaft to prevent said latch means from locking said first clutch sleeve in an axially retracted position.

2. The torque transmitting apparatus of claim 1 wherein said latch means includes:

(a) detent means mounted in said drive shaft for outward radial movement;

(b) a detent seat formed in said first clutch member and adapted to receive said detent means when said latch means locked said first clutch sleeve in an axially retracted position;

(c) said first clutch sleeve being mounted on said drive shaft for relative rotation through less than 360°; and (d) a torsion spring mounted on said shaft and operative to normally hold said first clutch sleeve in a relative position on said shaft wherein said detent seat is angularly aligned with said detent means, said spring being overcome or wound by driving said shaft in said one direction whereby said first clutch sleeve is rotated on said shaft to a position wherein said detent means is angularly displaced from said detent seat.

3. The torque transmitting apparatus of claim 2 including: cam means movable axially in said hollow drive shaft and operative to force said detent means radially outward into said detent seat.

4. A torque applying tool comprising:

(a) a casing;

(b) a rotary motor in said casing;

(c) a drive shaft rotatably mounted in said casing and connected to said rotary motor to be driven threby;

(d) a workpiece engaging member rotatably mounted on said casing;

(e) a torque release clutch interconnecting said drive shaft and said member and including a clutch element adapted to slide axially on said drive shaft to an axially retracted clutch-disengaged position when the torque on said drive shaft in one rotary direction exceeds a predetermined value;

(f) detent means mounted in said drive shaft to move radially outward;

(g) a detent seat provided in said clutch element and adapted to receive said detent means to lock said cltuch element in its retracted clutch-disengaged position;

(h) a torsion spring on said drive shaft normally rotating said clutch element on said drive shaft to a relative position wherein said detent means is angularly aligned with said detent seat, said torsion spring being arranged to be overcome by a torque load on said drive shaft in the other rotary direction to rotate said clutch element on said drive shaft to a position wherein said detent means is angularly displaced from said detent seat; and (i) means in said drive shaft and operative, in response to the engagement of said workpiece engaging member with a workpiece, to bias said detent means radially outward from said drive shaft.

5. A torque load transmission mechanism comprising:

(a) a driving member;

(b) a driven member;

(c) a clutch mechanism drivingly interconnecting said members and operative in one direction of rotation of said driving member to release said driven member from said driving member at a predetermined torque load and to remain in released position until the operator allows it to return to an engaged position;

(d) said clutch mechanism including an element which moves axially on one of said members during release of said clutch mechanism;

(e) said clutch mechanism including a detent seat and detent means operative to move radially into said detent seat for latching said clutch mechanism in a disengaged position in said one direction of rotation;

(f) means operative to cause said clutch mechanism to alternately interconnect and disconnect said members when said driving member is driven in the other rotary direction resulting in a series of rotary impacts being applied to the driven member;

(g) said last named means including a torsion spring operative to normally maintain said detent seat in an angular location relative to said detent means wherein said detent means is able to enter said detent seat when the clutch mechanism releases;

(h) said torision spring being adapted to be overcome by driving said driving member in the other rotary direction whereby said detent means is rotated to an angularly displaced position relative to said detent seat so that said detent means cannot enter said detent seat when said clutch mechanism releases.

References Cited by the Examiner

UNITED STATES PATENTS

| | | | |
|---|---|---|---|
| 1,537,628 | 5/25 | Street | 192—56 X |
| 1,537,629 | 5/25 | Street | 192—56 |
| 2,940,571 | 6/60 | Bernhard | 192—56 |
| 3,034,623 | 5/62 | Amtsberg | 192—56 |

DAVID J. WILLIAMOWSKY, *Primary Examiner.*